US011252245B2

(12) United States Patent
Shi et al.

(10) Patent No.: US 11,252,245 B2
(45) Date of Patent: Feb. 15, 2022

(54) INFORMATION PUSHING METHOD AND DEVICE

(71) Applicant: Baidu Online Network Technology (Beijing) Co., Ltd., Beijing (CN)

(72) Inventors: Xuyong Shi, Beijing (CN); Cong Han, Beijing (CN); Dengwu He, Beijing (CN); Luguang Wang, Beijing (CN); Xiufei Wang, Beijing (CN); Renpeng Liang, Beijing (CN); Jiajun Yang, Beijing (CN); Guoqing Liu, Beijing (CN); Cheng Yang, Beijing (CN); Zhimin Jiang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/509,410

(22) Filed: Jul. 11, 2019

(65) Prior Publication Data

US 2019/0335011 A1      Oct. 31, 2019

Related U.S. Application Data

(63) Continuation of application No. PCT/CN2017/118007, filed on Dec. 22, 2017.

(30) Foreign Application Priority Data

May 18, 2017   (CN) .......................... 201710351701.3

(51) Int. Cl.
*G06F 15/16*        (2006.01)
*H04L 29/08*        (2006.01)
(Continued)

(52) U.S. Cl.
CPC ............ *H04L 67/26* (2013.01); *G06F 16/953* (2019.01); *H04L 67/02* (2013.01); *H04L 41/142* (2013.01)

(58) Field of Classification Search
CPC ....... H04L 67/26; H04L 67/02; H04L 41/142; H04L 41/145; G06F 16/953; G06F 16/9535; G06F 16/951
See application file for complete search history.

(56) References Cited

U.S. PATENT DOCUMENTS 7,908,263 B1 *  3/2011  Paiz ...................... G06F 16/951
                                                              707/708
8,036,937 B2 * 10/2011  Tang .................... G06F 16/951
                                                              705/14.46
(Continued)

FOREIGN PATENT DOCUMENTS

CN          105095394 A      11/2015
CN          105701155 A       6/2016
(Continued)

*Primary Examiner* — Hieu T Hoang
(74) *Attorney, Agent, or Firm* — Knobbe, Martens, Olson & Bear LLP (57) ABSTRACT

Embodiments can include an information pushing method and device. An embodiment of the method can include: receiving an information stream data acquisition request sent by a terminal, wherein the information stream data acquisition request comprises query information; performing a query according to the query information to obtain first information stream data; acquiring at least one of a search record or a browsing record of an account associated with the terminal with respect to a predetermined time period; determining, based on the at least one of the search record or the browsing record, a keyword; determining second information stream data located in a preset information stream data set and matching the key word; generating, based on the first information stream data and the deter- (Continued)

mined second information stream data, data to be pushed; and pushing to the terminal the data to be pushed. The embodiment can achieve targeted information pushing.

9 Claims, 5 Drawing Sheets

(51) Int. Cl.
  *G06F 16/953* (2019.01)
  *H04L 12/24* (2006.01)

(56) References Cited

U.S. PATENT DOCUMENTS

| | | | | |
|---|---|---|---|---|
| 9,304,738 | B1* | 4/2016 | Xu | G06F 16/3334 |
| 9,406,077 | B1* | 8/2016 | Zhao | G06Q 30/0242 |
| 10,565,622 | B1* | 2/2020 | Burstein | G06Q 30/0266 |
| 2007/0112630 | A1* | 5/2007 | Lau | G06K 9/72 |
| | | | | 705/14.1 |
| 2008/0103887 | A1* | 5/2008 | Oldham | G06Q 30/0277 |
| | | | | 705/14.71 |
| 2012/0259702 | A1* | 10/2012 | Zhang | G06Q 30/0277 |
| | | | | 705/14.54 |
| 2014/0180825 | A1* | 6/2014 | Ramer | G06Q 30/0267 |
| | | | | 705/14.64 |
| 2015/0379569 | A1* | 12/2015 | Li | G06Q 30/0256 |
| | | | | 705/14.52 |
| 2016/0055545 | A1* | 2/2016 | Sugiura | G06Q 30/0277 |
| | | | | 705/14.71 |
| 2016/0358216 | A1* | 12/2016 | Glover | G06Q 30/0261 |
| 2018/0276734 | A1* | 9/2018 | Wu | G06Q 30/0631 |

FOREIGN PATENT DOCUMENTS

| | | |
|---|---|---|
| CN | 105721944 A | 6/2016 |
| CN | 106651429 A | 5/2017 |
| JP | 2001043282 A | 2/2001 |
| JP | 2012014652 A | 1/2012 |

* cited by examiner

INFORMATION PUSHING METHOD AND DEVICE

CROSS-REFERENCE TO RELATED APPLICATIONS

This application is a continuation of International Application No. PCT/CN2017/118007, filed on Dec. 22, 2017, which claims priority to Chinese Patent Application No. "201710351701.3" filed on May 18, 2017. All of the aforementioned applications are hereby incorporated by reference in their entireties.

TECHNICAL FIELD

The present disclosure relates to the field of computer technologies, and in particular to a method and apparatus for pushing information.

BACKGROUND

With the development of network technologies, at present many products such as search engines, Blog, SNS (Social Network Site) or RSS (Really Simple Syndication), publish information stream data by using information stream (Feed) systems. Information stream data refers to a syndicated feed, and may also be referred to as a source feed, a feed, a news feed, syndication, an abstract, a source, a news subscription, a web feed, etc. A website may transmit the latest information to users through the information stream data, and the prerequisite that users can subscribe the website is that the website is capable of providing continuously updated information. The advantage of information stream presentation lies in that it allows users to see the latest data every time they query, and the experience is much better than that of the conventional open and display presentation.

In the prior art, when a user enters a page that carries information stream data, in addition to the information subscribed by the user, the server may also pushes other information to the user, for example, event information of a recent event held by the website or advertisement information. However, the other information pushed to the user by the server is usually not what the user needs and lacks pertinence.

SUMMARY

Some embodiments of the present disclosure are directed to providing an improved method and apparatus for pushing information, to solve the technical problems mentioned in the background.

In a first aspect, embodiments of the present disclosure provide a method for pushing information, the method including: receiving an information stream data acquisition request sent by a terminal, the information stream data acquisition request including query information; performing a query according to the query information to obtain first information stream data; acquiring a search record and/or a browsing record of an account associated with the terminal, the search record and/or the browsing record being within a predetermined time period; determining a keyword based on the search record and/or the browsing record; determining, in a preset information stream data set, second information stream data matching the keyword; generating to-be-pushed data based on the first information stream data and the determined second information stream data; and pushing the to-be-pushed data to the terminal.

In this embodiment, the determining a keyword based on the search record and/or the browsing record includes: acquiring a search statement in the search record and/or a content of a browsed page in the browsing record; parsing the search statement and/or the content, to obtain an alternative word set; for each alternative word in the alternative word set, determining, in a preset information stream data set, second information stream data matching the alternative word; determining, on a basis of a pre-trained first probability determination model, a first probability of receiving a visit request for a page sent by the terminal, where the page includes a page pointed to by the second information stream data matching the alternative word, and the first probability determination model is used to characterize a corresponding relationship between at least one of the following information items and the first probability: account information of an account associated with the terminal, a device type of the terminal, a browser type of a browser used by the terminal, the alternative word, information of an industry to which the alternative word belongs, or source of the alternative word; and selecting the keyword from the alternative word set based on the first probability.

In this embodiment, for each piece of information stream data in the preset information stream data set, an attribute value corresponding to the piece of information stream data is preset; and the selecting the keyword from the alternative word set based on the first probability includes: for each alternative word in the alternative word set, executing the following score determination operations: acquiring a preset attribute value corresponding to the second information stream data matching the alternative word, and determining, based on the acquired attribute value, an attribute value corresponding to the alternative word; calculating a product of the attribute value corresponding to the alternative word and the first probability corresponding to the alternative word; acquiring weights preset for the first probability, the attribute value and the product, and performing, according to the acquired weights, weighted summation on the attribute value corresponding to the alternative word, the first probability corresponding to the alternative word, and the product to obtain a score corresponding to the alternative word; and selecting, from the respective alternative words of the alternative word set, a predetermined number of alternative words as keywords according to an order of the scores from high to low.

In this embodiment, the parsing the search statement and/or the content to obtain an alternative word set includes: performing statistical analysis and/or semantic parsing on the search statement and/or the content, to extract at least one core word; expanding each core word in the at least one core word to obtain an expanded word, where the expanded word includes at least one of the following: a synonym of the core word, a near-synonym of the core word, or an associated word of the core word; and determining the core word and the obtained expanded word as keywords.

In this embodiment, the generating to-be-pushed data based on the first information stream data and the determined second information stream data includes: in response to the number of the determined second information stream data being greater than a preset number, executing the following score determination operation for each piece of second information stream data in the determined second information stream data: acquiring a preset attribute value corresponding to the second information stream data; respectively determining, on a basis of a pre-trained second probability determination model, a second probability of receiving a request sent by the terminal for visiting a page pointed to by the second information stream data, where the second probability determination model is used to characterize a corresponding relationship between at least one of the following information items and the second probability: account information of an account associated with the terminal, a device type of the terminal, type information of a browser used by the terminal, or feature information of the second information stream data; and determining a score of the second information stream data based on the acquired attribute value and the second probability; selecting, from the determined second information stream data, a preset number of second information stream data according to an order of the scores from high to low i; and aggregating the first information stream data and the selected second information stream data to generate to-be-pushed data.

In a second aspect, the embodiments of the present disclosure provide an apparatus for pushing information, the apparatus including: a receiving unit, configured to receive an information stream data acquisition request sent by a terminal, the information stream data acquisition request including query information; a query unit, configured to perform a query according to the query information to obtain first information stream data; an acquisition unit, configured to acquire a search record and/or a browsing record of an account associated with the terminal, the search record and/or the browsing record being within a predetermined time period; a first determination unit, configured to determine a keyword based on the search record and/or the browsing record; a second determination unit, configured to determine second information stream data matching the keyword in a preset information stream data set; a generation unit, configured to generate to-be-pushed data based on the first information stream data and the determined second information stream data; and a push unit, configured to push the to-be-pushed data to the terminal.

In this embodiment, the first determination unit includes: an acquisition subunit, configured to acquire a search statement in the search record and/or content of a browsed page in the browsing record; an analysis subunit, configured to parse the search statement and/or the content, to obtain an alternative word set; a first determination subunit, configured to determine, for each alternative word in the alternative word set, in a preset information stream data set, second information stream data matching the alternative word, and determine, on a basis of a pre-trained first probability determination model, a first probability of receiving a visit request for a page sent by the terminal, where the page includes a page pointed to by the second information stream data matching the alternative word, and the first probability determination model is used to characterize a corresponding relationship between at least one of the following information items and the first probability: account information of an account associated with the terminal, a device type of the terminal, a browser type of a browser used by the terminal, the alternative word, information of an industry to which the alternative word belongs, or source of the alternative word; and a first selection subunit, configured to select the keyword from the alternative word set based on the first probability.

In this embodiment, for each piece of information stream data in the preset information stream data set, an attribute value corresponding to the piece of information stream data is preset; and the first selection subunit includes: a first determination module, configured to execute the following score determination operations for each alternative word in the alternative word set: acquiring a preset attribute value corresponding to the second information stream data matching the alternative word, and determining, based on the acquired attribute value, an attribute value corresponding to the alternative word; calculating a product of the attribute value corresponding to the alternative word and the first probability corresponding to the alternative word; acquiring weights preset for the first probability, the attribute value and the product, and performing, based on the acquired weight, weighted summation on the attribute value corresponding to the alternative word, the first probability corresponding to the alternative word, and the product to obtain a score corresponding to the alternative word; and a selection module, configured to select, from respective alternative words of the alternative word set, a predetermined number of alternative words as keywords according to an order of the scores from high to low.

In this embodiment, the analysis subunit includes: an analysis module, configured to perform statistical analysis and/or semantic parsing on the search statement and/or the content, to extract at least one core word; an expansion module, configured to expand each core word in the at least one core word to obtain an expanded word, where the expanded word includes at least one of the following: a synonym of the core word, a near-synonym of the core word, or an associated word of the core word; and a second determination module, configured to determine the core word and the obtained expanded word as keywords.

In this embodiment, the generation unit includes: a second determination subunit, configured to execute, in response to the number of the determined second information stream data being greater than a preset number, the following score determination operation for each piece of second information stream data in the determined second information stream data: acquiring a preset attribute value corresponding to the second information stream data; respectively determining, on a basis of a pre-trained second probability determination model, a second probability of receiving a request sent by the terminal for visiting a page pointed to by the second information stream data, where the second probability determination model is used to characterize a corresponding relationship between at least one of the following information items and the second probability: account information of an account associated with the terminal, a device type of the terminal, type information of a browser used by the terminal, or feature information of the second information stream data; and determining a score of the second information stream data based on the acquired attribute value and the second probability; a second selection subunit, configured to select, from the determined second information stream data, a preset number of second information stream data according to an order of the scores from high to low; and an aggregation subunit, configured to aggregate the first information stream data and the selected second information stream data to generate to-be-pushed data.

In a third aspect, the embodiments of the present disclosure provide a device, including: one or more processors; and a storage apparatus, configured to store one or more programs, where when the one or more programs are executed by the one or more processors, the one or more processors implement the method described in the first aspect.

In a fourth aspect, the embodiments of the present disclosure provide a computer readable storage medium on which computer programs are stored, where when the programs are executed by processors, the method in the first aspect is implemented.

The method and apparatus for pushing information according to the embodiments of the present disclosure realize targeted information push by receiving an information stream data acquisition request sent by a terminal, performing a query according to the query information to obtain first information stream data, then acquiring a search record and a browsing record of an account associated with the terminal, the search record and/or the browsing record being within a predetermined time period, determining a keyword based on the search record and/or the browsing record, determining second information stream data matching the keyword in a preset information stream data set, finally generating to-be-pushed data based on the first information stream data and the determined second information stream data, and pushing the to-be-pushed data to the terminal.

BRIEF DESCRIPTION OF THE DRAWINGS

Other features, objectives and advantages of the present disclosure will become more apparent by reading detailed descriptions of non-restrictive embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments FIG. 1 shows a system architecture 100 to which some embodiments of a method for pushing information or an apparatus for pushing information according to the present disclosure can be applied.

Figure 1:
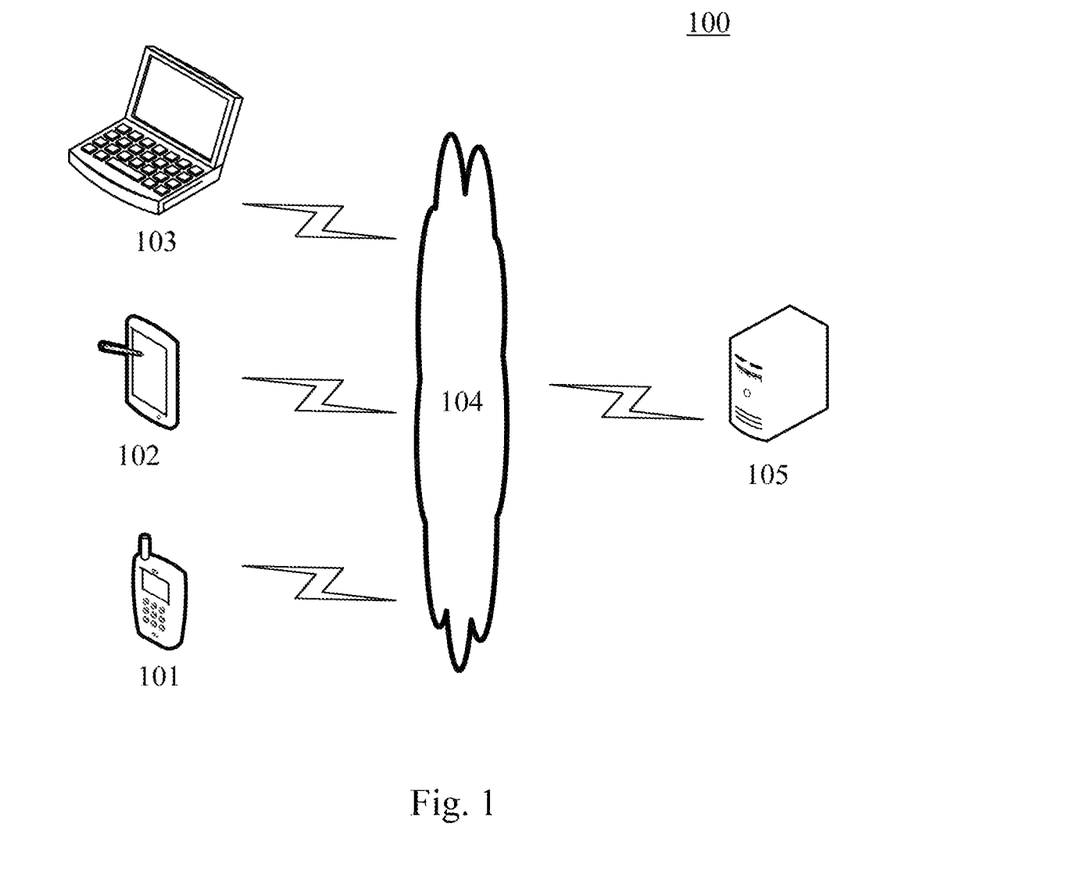
FIG. 1 is a system architecture diagram to which some embodiments of the present disclosure can be applied.

As shown in FIG. 1, the system architecture 100 may include terminal devices 101, 102 and 103, a network 104, and a server 105. The network 104 is configured to provide a medium of a communication link between the terminal devices 101, 102 and 103 and the server 105. The network 104 may include various connection types, such as wired or wireless communication links or optical fiber cables.

A user may interact with the server 105 by using the terminal device 101, 102 or 103 through the network 104 to receive or send messages, etc. A variety of applications, such as web browser applications, shopping applications, search applications, instant messaging tools, e-mail clients and social platform software, may be installed on the terminal devices 101, 102 and 103.

The terminal devices 101, 102 and 103 may be various types of electronic devices with display screens and supporting text entry, including but not limited to a smart phone, a tablet computer, an e-book reader, an MP3 player (Moving Picture Experts Group Audio Layer III), an MP4 player (Moving Picture Experts Group Audio Layer IV), a laptop computer, a desktop computer, etc.

The server 105 may be a server providing various services, for example, a background server providing a support for an application using an information stream system on the terminal 101, 102 or 103. The server 105 may receive an information stream data acquisition request sent by the terminal device 101, 102 or 103, perform a query according to the query information to obtain first information stream data, acquire a search record and a browsing record of an account associated with the terminal, the search record and the browsing record being within a predetermined time period, determine a keyword based on the search record and/or the browsing record, determine, in a preset information stream data set, second information stream data matching the keyword, finally generate to-be-pushed data based on the first information stream data and the determined second information stream data, and push the to-be-pushed data to the terminal device 101, 102 or 103.

It should be noted that the method for pushing information, provided by the embodiments of the present disclosure, may be executed by the server 105, and accordingly, the apparatus for pushing information may be arranged in the server 105.

It should be appreciated that the numbers of the terminal devices, the network and the server in FIG. 1 are only schematic. According to an implementation requirement, any number of terminal devices, networks and servers may be provided.

Figure 2:
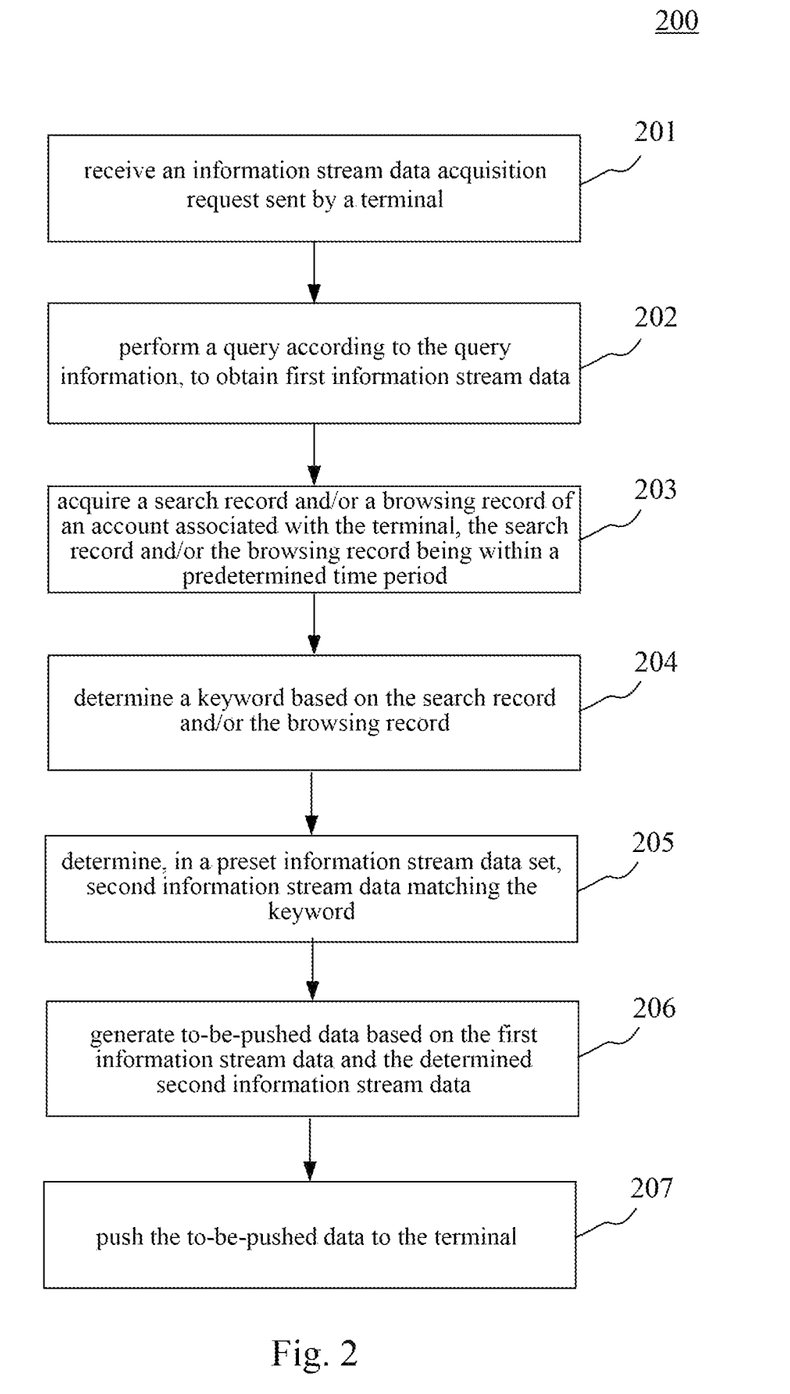
FIG. 2 is a schematic flowchart of an embodiment of a method for pushing information.

Continue to refer to FIG. 2, which shows a process 200 of an embodiment of the method for pushing information. The method for pushing information includes the following steps:

Step 201: receiving an information stream data acquisition request sent by a terminal.

In this embodiment, an electronic device (e.g., the server shown in FIG. 1) on which the method for pushing information runs may receive an information stream data acquisition request sent by a terminal.

The information stream data acquisition request may be a request sent by the terminal when an application using an information stream data system is started, or a request sent by the terminal in response to a specific operation of a user, such as a query operation, an operation of opening an information stream data display page, or an operation of refreshing a page displaying information stream data. As an example, after a user inputs a query statement in a search bar, a stream data acquisition request may be sent to a server by clicking a query button or pressing an enter key; or when a user is browsing a page displaying information stream data, a stream data acquisition request may be sent to a server by a gesture of sliding down or clicking on an area for indicating a refresh operation, to acquire unread information stream data.

By clicking on the area displaying the information stream data, the page pointed to by the information stream data may be accessed. The information stream data may be interpreted as data obtained by integrating the page pointed to by the information stream data, and may include the title of content of the page pointed to by the information stream data, a page link pointed to by the information stream data, description information of content of the page pointed to by the information stream data, etc., such as a search result in a search result page, or a message or a trend issued by a user in a social application.

The information stream data acquisition request includes query information, the query information may be information for indicating how to acquire first information stream data, and the first information stream data may be information stream data subscribed or queried by the user. As an example, the query information may be a query statement input by the user, or account information of an account associated with the terminal, such as an account identifier. A subscription list or an interest list of the account may be acquired from a database via the account identifier, and data issued by the account in the list may be further acquired.

Step 202: performing a query according to the query information to obtain first information stream data.

In this embodiment, the above electronic device may perform a query according to the query information acquired in step 201, to obtain first information stream data. As an example, the above electronic device may query, in a corresponding database, the information stream data matching the query statement input by the user as the first information stream data; the above electronic device may also first query the interest list of the account associated with the terminal that sends the information stream data acquisition request, to obtain the identifier of an account of interest, then query the information published by the account of interest according to the identifier of the account of interest, and use the information that has not been pushed to the terminal in the information published by the account of interest as the first information stream data.

Step 203: acquiring a search record and/or a browsing record of an account associated with the terminal, the search record and/or the browsing record being within a predetermined time period.

In this embodiment, the above electronic device may acquire a search record and/or a browsing record of an account associated with the terminal, the search record and/or the browsing record being within a predetermined time period. The account associated with the terminal may be an account currently logged in on the terminal, or an account established according to device information of the terminal or other associated information, e.g., an account established according to IMEI (International Mobile Equipment Identity) or SIM (Subscriber Identification Module). The predetermined time period may be the recent time period, e.g., the past few weeks, or the past few days. Specifically, the predetermined time period may be set according to actual needs, and when many search records and/or browsing records are provided, the predetermined time period may be appropriately shortened. The search record may be a search record of the account associated with the terminal in a search engine, or a search record of the account associated with the terminal in other application. The browsing record may be a record of the pages that the user has visited in the application adopting the information stream data system, the pages being pointed to by the information stream data.

Step 204: determining a keyword based on the search record and/or the browsing record.

In this embodiment, the above electronic device may determine a keyword based on the search record and/or the browsing record acquired in step 203. The above electronic device may directly extract from the search record a search word input by the user, or extract from the browsing record a title or a label of a page browsed by the user, and segment the search word, the title or the label to obtain a keyword. When too many words are obtained, some screening operations may be performed, to prevent excessive keywords from affecting the execution efficiency of subsequent steps of the information.

Step 205: determining, in a preset information stream data set, second information stream data matching the keyword.

In this embodiment, the above electronic device may determine, in a preset information stream data set, second information stream data matching the keyword determined in step 204. The preset information stream data set may be an information stream data set pre-stored in a database associated with the electronic device, or a set of a number of information stream data used for promotion, e.g., advertisement data. The above electronic device may generate a query message (Query) based on the keyword, send the generated query message to the database storing the preset information stream data set, and determine the information stream data returned by the database as the second information stream data matching the keyword. The second stream data matching the keyword may be information stream data including the keyword or an expanded word of the keyword. Alternatively, a label may be preset for each piece of the information stream data in the information stream data set, as an example, an enterprise needs to publish promotion information, and when the promotion information provided is acquired, the label set for the promotion information may be acquired. For example, if a brand is going to promote a mobile phone, the mobile phone, dual cameras, the name of the brand and the names of other mobile phone brands may be set as labels while the introduction information of the mobile phone is provided.

Step 206: generating to-be-pushed data based on the first information stream data and the determined second information stream data.

In this embodiment, the above electronic device may generate to-be-pushed data base on the first information stream data and the second information stream data determined in step 205. The electronic device may aggregate, according to the layout information of a terminal page, the first information stream data and the determined second information stream data to generate to-be-pushed data. The layout information may be used to indicate the number of information stream data displayed on the page, and the distribution of the first information stream data and the determined second information stream data, for example, one piece of determined second information stream data is inserted every certain number of first information stream data.

Step 207: pushing the to-be-pushed data to the terminal.

In this embodiment, the above electronic device may push the to-be-pushed data generated in step 206 to the terminal through the network, for display by the terminal.

The method provided by the above embodiment of the present disclosure realizes targeted information push by receiving an information stream data acquisition request sent by a terminal, performing a query according to the query information to obtain first information stream data, then acquiring a search record and a browsing record of an account associated with the terminal, the search record and/or the browsing record being within a predetermined time period, determining a keyword on the basis of the search record and/or the browsing record, determining, in a preset information stream data set, second information stream data matching the keyword, finally generating to-bepushed data based on the first information stream data and the determined second information stream data, and pushing the to-be-pushed data to the terminal.

In some optional implementations of this embodiment, the generating to-be-pushed data based on the first information stream data and the determined second information stream data includes: in response the number of the determined second information stream data being greater than a preset number, executing the following score determination operation for each piece of second information stream data in the determined second information stream data: acquiring a preset attribute value corresponding to the second information stream data; respectively determining, on the basis of a pre-trained second probability determination model, a second probability of receiving a request sent by the terminal for visiting a page pointed to by the second information stream data; selecting, from the determined second information stream data, a preset number of second information stream data according to an order of the scores from high to low; and aggregating the first information stream data and the selected second information stream data to generate to-be-pushed data.

In this implementation, the preset number may be the number of the second information stream data displayed on the indication page in the layout information of the terminal page, and may be specifically set according to actual needs. The attribute value corresponding to the information stream data may be a parameter value for characterizing the feature thereof, for example, the information stream data is advertisement data, and the attribute value corresponding to the advertisement data may be a bid of a customer for the advertisement data, or the number of clicks or pushes on the advertisement data, etc.

The second probability determination model may be used to characterize a corresponding relationship between at least one of the following information items and the second probability: account information of an account associated with the terminal, a device type of the terminal, type information of a browser used by the terminal, or feature information of the second information stream data. The account information of the account associated with the terminal may be information such as age, occupation, location, hobbies, accounts of interest, or subscribed columns. The feature information of the second information stream data may be information for characterizing the core content of the second information stream data, and may be obtained by semantic analysis on the second information stream data. The feature information may also be preset for the second information stream data, for example, the second information stream data is promotion information, and the feature information thereof may be a label set by a party providing the promotion information.

As an example, the above electronic device may train a model for classification such as an initial Naive Bayesian Model (NBM) or a Support Vector Machine (SVM) by using each of the above information items recorded in historical records as inputs, and using the ratios, obtained according to the historical record statistic, of receiving the request for visiting the pages pointed to by the second information stream data as outputs, to obtain the second probability determination model. The second probability determination model may also be a corresponding relationship table being previously created by a technician on the basis of the statistics on a large amount of the above information items and the second probability and storing corresponding relationships between the plurality of information items and the second probability; or a calculation formula preset by a technician on the basis of statistics on a large amount of data and stored into the electronic device, where the calculation formula quantifies and calculates one or more of the information items to obtain a calculation result used for characterizing the second probability, for example, the calculation formula may be a formula for calculating the correlation between the account information and the feature information, and if the obtained correlation is high, then the second probability is large.

In this implementation, the determining the score of the second information stream data based on the acquired attribute value and the second probability, may be calculating a product of the acquired attribute value and the second probability as the score of the second information stream data, or normalizing the attribute value, weighted summing based on preset weights the normalized value and the second probability to obtain the score of the second information stream data.

Figure 3:
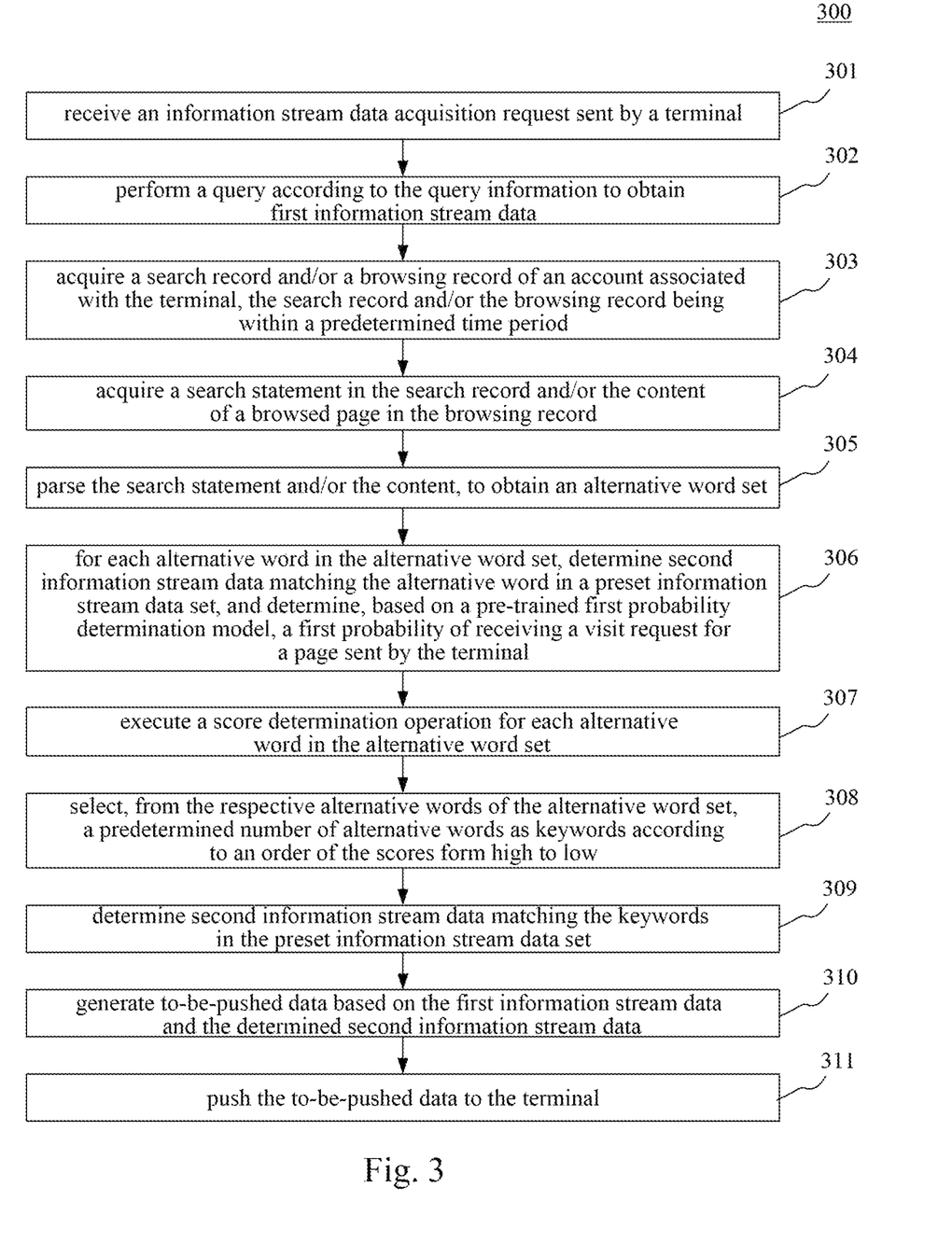
FIG. 3 is a schematic flowchart of another embodiment of the method for pushing information.

Refer to FIG. 3, which is a process diagram of another embodiment of the method for pushing information.

In FIG. 3, the process 300 of the method for pushing information includes the following steps:

Step 301: receiving an information stream data acquisition request sent by a terminal.

In this embodiment, an electronic device (e.g., the server shown in FIG. 1) on which the method for pushing information runs may receive an information stream data acquisition request sent by a terminal.

Step 302: performing a query according to the query information to obtain first information stream data.

In this embodiment, the electronic device may perform the query according to the query information acquired in step 301 to obtain first information stream data.

Step 303: acquiring a search record and/or a browsing record of an account associated with the terminal, the search record and/or the browsing record being within a predetermined time period.

In this embodiment, the electronic device may acquire a search record and/or a browsing record of an account associated with the terminal, the search record and/or the browsing record being a predetermined time period.

Step 304: acquiring a search statement in the search record and/or content of a page browsed in the browsing record.

In this embodiment, the electronic device may acquire a search statement in the search record acquired in step 303 and/or the content of a page browsed in the browsing record.

Step 305: parsing the search statement and/or the content to obtain an alternative word set.

In this embodiment, the electronic device may parse the search statement and/or content acquired in step 304 to obtain an alternative word set. The parsing the search statement and/or content to obtain an alternative word set may include: performing statistical analysis and/or semantic parsing on the search statement and/or the content, to extract at least one core word; expanding each core word in the at least one core word to obtain an expanded word, where the expanded word includes at least one of the following: a synonym of the core word, a near-synonym of the core word, or an associated word of the core word; and determining the core word and the obtained expanded word as keywords. As an example, in the expanding operation, the core word "children" may have a synonym "kids"; the core word "Chinese medicine" may have a near-synonym "herb", and "attendance" may have a near-synonym "participation"; the core word "cold" may have an associated word "fever" or "influenza", and brand names of different brands producing the same product or names of different products under the same brand may also be mutually associated words.

As an example, the statistical analysis may include counting and ranking the occurrence frequency of each word being there in the search statement and/or the content, and then selecting one or more words with the highest frequency of occurrence as keywords. The semantic parsing may include segmenting the content into words by processing the content, such as omni-segmenting the content, then calculating the importance of the obtained words (for example, using the method of Term Frequency-Inverse Document Frequency (TF-IDF)), and obtaining keywords based on the result of the importance calculation. Through the expanding operation, the keywords are richer, and the accuracy of information push is further improved.

Step 306: for each alternative word in the alternative word set, determining, in a preset information stream data set, second information stream data matching the alternative word, and determining, on the basis of a pre-trained first probability determination model, a first probability of receiving a visit request for a page sent by the terminal.

In this embodiment, the electronic device may first determine in a preset information stream data set, for each alternative word in the alternative word set obtained in step 305, second information stream data matching the alternative word; then acquire input data required by a first probability model, and import the input data into a pre-trained first probability determination model to determine a first probability of receiving a visit request for pages sent by the terminal, the page including a page pointed to by the second information stream data matching the alternative word.

The first probability determination model may be used to characterize a corresponding relationship between at least one of the following information items and the first probability: account information of an account associated with the terminal, a device type of the terminal, a browser type of a browser used by the terminal, alternative words, information of an industry to which the alternative words belong, or source of the alternative words. The information of the industry of the alternative words may be information for characterizing the industry or field of the alternative words, such as the automobile industry, or the mobile phone industry. The source of the alternative words is used to characterize the source of the alternative words, for example, a search statement input by a user, or a browsing record.

As an example, the electronic device may train a model for classification such as an initial naive Bayesian model or a support vector machine by using each of the above information items recorded in historical records as inputs, and using the ratios, obtained according to the historical record statistic, of receiving the request for visiting the pages pointed to by the first information stream data as outputs, to obtain the first probability determination model. The first probability determination model may also be a corresponding relationship table being previously created by a technician on the basis of the statistics on a large amount of the above information items and the first probability and storing corresponding relationships between the plurality of information items and the first probability; or a calculation formula preset by a technician on the basis of statistics on a large amount of data and stored into the electronic device, where the calculation formula quantifies and calculates one or more of the information items to obtain a calculation result used for characterizing the first probability, for example, the calculation formula may be a formula for calculating the correlation between the hobbies or occupation in the account information of the account associated with the terminal and the industry information of the industry of the alternative words, and if the obtained correlation is high, then the first probability is large.

Step 307: executing a score determination operation for each alternative word in the alternative word set.

In this embodiment, for each piece of information stream data in the preset information stream data set, an attribute value corresponding to the information stream data is preset. The score determination operation executed by the electronic device for each alternative word in the alternative word set obtained in step 305 may include: acquiring a preset attribute value corresponding to the second information stream data matching the alternative word, and determining, based on the acquired attribute value, an attribute value corresponding to the alternative word; calculating a product of the attribute value corresponding to the alternative word and the first probability corresponding to the alternative word determined in step 306; acquiring weights preset for the first probability, the attribute value and the product, and performing, based on the acquired weights, weighted summation on the attribute value corresponding to the alternative word, the first probability corresponding to the alternative word, and the product to obtain a score corresponding to the alternative word.

In this embodiment, there may be multiple pieces of second information stream data matching the alternative word, each piece of second information stream data has an attribute value corresponding thereto, and an average value of the multiple attribute values may be used as the attribute value corresponding to the alternative word, or the highest attribute value is used as the attribute value corresponding to the alternative word. Scores corresponding to respective alternative words are obtained by a method of multi-target fusion. A set of initial weights may be set by analyzing the average value of the both, and then the weights are continuously adjusted according to actual needs. A set of superior weights is finally obtained. For example, the score corresponding to the alternative word may be calculated via the following formula:

$$S = W_1 \times P + W_2 \times V + W_3 \times P \times V; \quad (1)$$

Where S represents a score corresponding to an alternative word, P represents a first probability corresponding to the alternative word, V represents an attribute value corresponding to the alternative word, $W_1$ represents a weight set for the first probability, $W_2$ represents a weight set for the attribute value, and $W_3$ represents a weight set for the product of the first probability and the attribute value.

Step 308: selecting, from respective alternative words of the alternative word set, a predetermined number of alternative words as keywords according to an order of the scores from high to low.

In this embodiment, the electronic device may select a predetermined number of alternative words as keywords from the respective alternative words of the alternative word set according to an order of the scores obtained in step 307 from high to low. The predetermined number may be determined according to the amount of computation bearable for the system, and an excessive predetermined number may affect the efficiency of information push. As an example, the predetermined number may be two.

Step 309: determining, in the preset information stream data set, second information stream data matching the keyword.

In this embodiment, the electronic device may determine second information stream data matching the keywords determined in step 308 in the preset information stream data set.

Step 310: generating to-be-pushed data based on the first information stream data and the determined second information stream data.

In this embodiment, the electronic device may generate to-be-pushed data based on the first information stream data and the second information stream data determined in step 309.

Step 311: pushing the to-be-pushed data to the terminal.

In this embodiment, the electronic device may push the to-be-pushed data generated in step 310 to the terminal through the network for display by the terminal.

The implementation details and technical effects of steps 301-303 and steps 309-311 may refer to the descriptions insteps 201-203 and steps 205-207, and details are not described herein again.

It may be seen from FIG. 3 that, compared with the corresponding embodiment of FIG. 2, the process 300 of the method for pushing information in the present embodiment highlights the step of determining keywords. Thus, the solution described in this embodiment may determine a keyword most fit with the user's need, thereby achieving more efficient information push.

Figure 4:
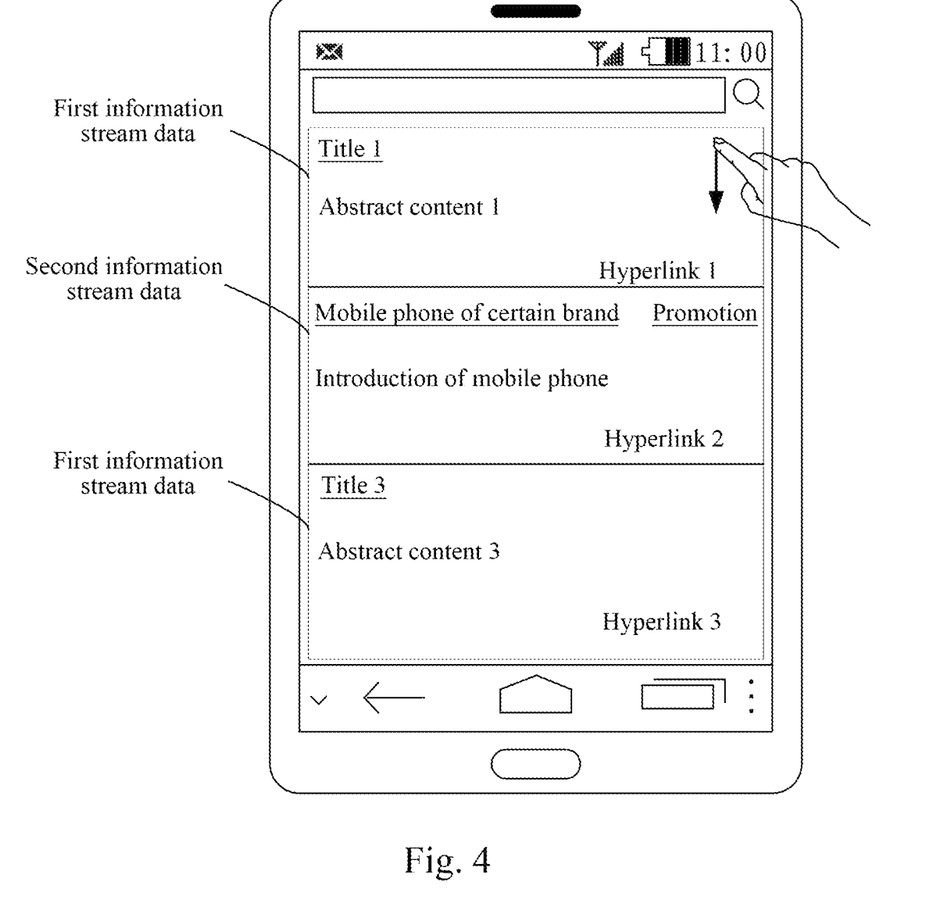
FIG. 4 is a schematic diagram of an application scenario of the method for pushing information according to an embodiment.

Continue to refer to FIG. 4, which is a schematic diagram of an application scenario of the method for pushing information according to an embodiment. In the application scenario of FIG. 4, when the current page does not include information stream data that the user has not read, the user sends an information stream data acquisition request to the server through the terminal by a gesture operation of pressing and sliding down. Through an account identifier included in the request, the server finds a user's subscription list, and acquires, according to the subscription list, unread information stream data subscribed by the user as first information stream data. The server also finds a user's search record and/or browsing record within a predetermined time period via the account identifier, and discovers that the user has searched for "price of certain brand mobile phone" or "release time of certain brand mobile phone", or the user has browsed a page entitled "top ten reasons for buying a mobile phone of certain brand" or "mobile phone performance comparison." The "certain brand", "mobile phone", other mobile phone brands with similar prices, or product names of other products under certain brand may be determined as keywords, for querying the second information stream data matching the keywords in a preset promotion data set is queried. Finally, to-be-pushed data is generated based on the first information stream data and the determined second information stream data, and the to-be-pushed data is pushed to the terminal.

Figure 5:
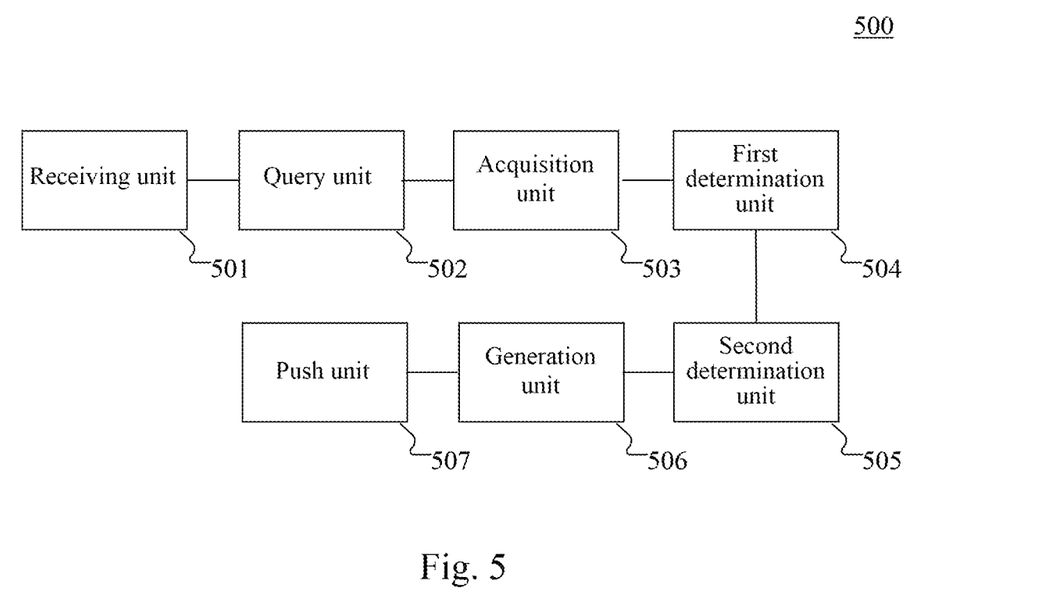
FIG. 5 is an example structure diagram of an embodiment of an apparatus for pushing information.

Further refer to FIG. 5, as an implementation of the method, the present disclosure provides an embodiment of an apparatus for pushing information, the embodiment of the apparatus corresponds to the embodiment of the method shown in FIG. 2, and the apparatus may be specifically applied to various types of electronic devices.

As shown in FIG. 5, the apparatus 500 for pushing information in this embodiment includes: a receiving unit 501, a query unit 502, an acquisition unit 503, a first determination unit 504, a second determination unit 505, a generation unit 506, and a push unit 507, where the receiving unit 501 is configured to receive an information stream data acquisition request sent by a terminal, the information stream data acquisition request including query information; the query unit 502 is configured to perform a query according to the query information to obtain first information stream data; the acquisition unit 503 is configured to acquire a search record and/or a browsing record of an account associated with the terminal, the search record and/or the browsing record being within a predetermined time period; the first determination unit 504 is configured to determine a keyword based on the search record and/or the browsing record; the second determination unit 505 is configured to determine second information stream data matching the keyword in a preset information stream data set; the generation unit 506 is configured to generate to-be-pushed data based on the first information stream data and the determined second information stream data; and the push unit 507 is configured to push the to-be-pushed data to the terminal.

In this embodiment, the specific processing of the receiving unit 501, the query unit 502, the acquisition unit 503, the first determination unit 504, the second determination unit 505, the generation unit 506, and the push unit 507 may refer to steps 201, 202, 203, 204, 205, 206, and 207 of the corresponding embodiment in FIG. 2, and details are not described herein again.

In some optional implementations of this embodiment, the first determination unit 504 includes: an acquisition subunit (not shown), configured to acquire a search statement in the search record and/or content of a browsed page in the browsing record; a parsing subunit (not shown), configured to parse the search statement and/or the content, to obtain an alternative word set; a first determination subunit (not shown), configured to determine, for each alternative word in the alternative word set, second information stream data matching the alternative word in a preset information stream data set, and determine, on the basis of a pre-trained first probability determination model, a first probability of receiving a visit request for a page sent by the terminal, where the page includes a page pointed to by the second information stream data matching the alternative word, and the first probability determination model is used to characterize a corresponding relationship between at least one of the following information items and the first probability: account information of an account associated with the terminal, a device type of the terminal, a browser type of a browser used by the terminal, the alternative word, information of an industry to which the alternative word belongs, or source the alternative word; and a first selection subunit (not shown), configured to select the keyword from the alternative word set based on the first probability.

In some optional implementations of this embodiment, for each piece of information stream data in the preset information stream data set, an attribute value corresponding to the piece of information stream data is preset; and the first selection subunit (not shown) includes: a first determination module (not shown), configured to execute the following score determination operations for each alternative word in the alternative word set: acquiring a preset attribute value corresponding to the second information stream data matching the alternative word, and determining, based on the acquired attribute value, an attribute value corresponding to the alternative word; calculating a product of the attribute value corresponding to the alternative word and the first probability corresponding to the alternative word; acquiring weights preset for the first probability, the attribute value and the product, and performing, based on the acquired weights, weighted summation on the attribute value corresponding to the alternative word, the first probability corresponding to the alternative word, and the product to obtain a score corresponding to the alternative word; and a selection module (not shown), configured to select a predetermined number of alternative words as keywords from the respective alternative words of the alternative word set according to an order of the scores from high to low.

In some optional implementations of this embodiment, the analysis subunit (not shown) includes: an analysis module (not shown), configured to perform statistical analysis and/or semantic parsing on the search statement and/or content to extract at least one core word; an expansion module (not shown), configured to expand each core word in the at least one core word to obtain an expanded word, where the expanded word includes at least one of the following: a synonym of the core word, a near-synonym of the core word, or an associated word of the core word; and a second determination module (not shown), configured to determine the core word and the obtained expanded word as keywords.

In some optional implementations of this embodiment, the generation unit 506 includes: a second determination subunit (not shown), configured to execute, in response to the number of the determined second information stream data being greater than a preset number, the following score determination operation for each piece of second information stream data in the determined second information stream data: acquiring a preset attribute value corresponding to the second information stream data; respectively determining, on the basis of a pre-trained second probability determination model, a second probability of receiving the request sent by the terminal for visiting a page pointed by the second information stream data, where the second probability determination model is used to characterize a corresponding relationship between at least one of the following information items and the second probability: account information of an account associated with the terminal, a device type of the terminal, type information of a browser used by the terminal, or feature information of the second information stream data; and determining a score of the second information stream data based on the acquired attribute value and the second probability; a second selection subunit (not shown), configured to select a preset number of second information stream data from the determined second information stream data according to an order of the scores from high to low; and an aggregation subunit (not shown), configured to aggregate the first information stream data and the selected second information stream data to generate to-be-pushed data.

It may be seen from FIG. 5 that the apparatus 500 for pushing information in this embodiment realizes targeted information push by receiving an information stream data acquisition request sent by a terminal, performing a query according to the query information to obtain first information stream data, then acquiring a search record and a browsing record of an account associated with the terminal, the search record and/or the browsing record being within a predetermined time period, determining a keyword based on the search record and/or the browsing record, determining second information stream data matching the keyword in a preset information stream data set, finally generating to-be-pushed data based on the first information stream data and the determined second information stream data, and pushing the to-be-pushed data to the terminal.

Figure 6:
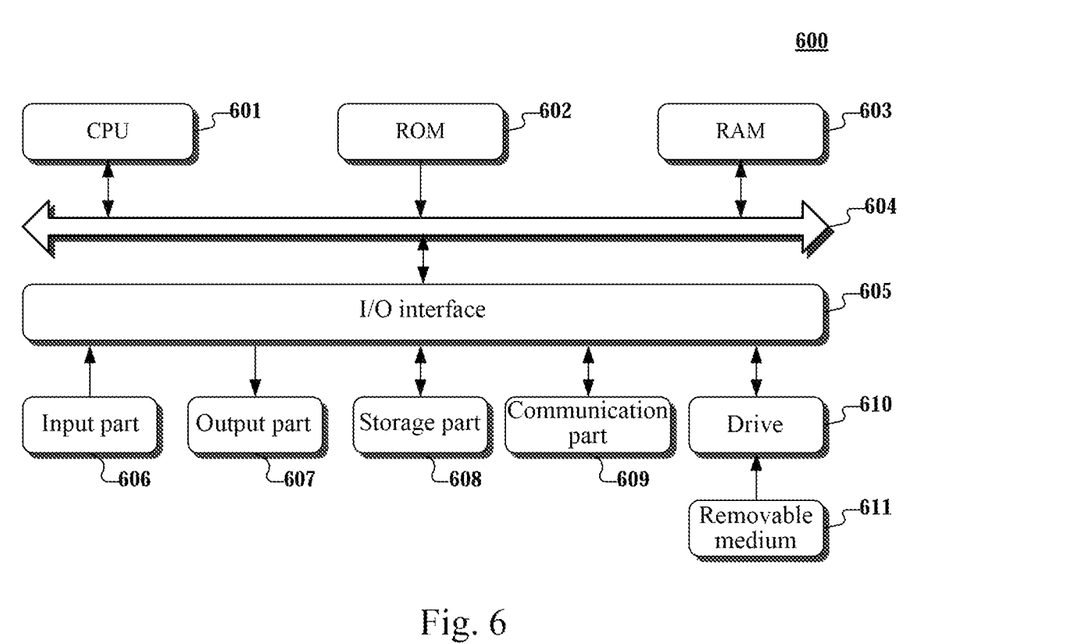
FIG. 6 is a structure diagram of a computer system of a server suitable for implementing some embodiments.

Referring to FIG. 6, a schematic structural diagram of a computer system 600 adapted to implement the server of some embodiments is shown. The server shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a receiving unit, a query unit, an acquisition unit, a first determination unit, a second determination unit, a generation unit, a push unit. Here, the names of these units do not in some cases constitute a limitation to such units themselves. For example, the receiving unit may also be described as "a unit for receiving an information stream data acquisition request sent by a terminal."

In another aspect, the present disclosure further provides a computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: receiving an information stream data acquisition request sent by a terminal, the information stream data acquisition request comprising query information; performing a query according to the query information to obtain first information stream data; acquiring a search record and/or a browsing record of an account associated with the terminal, the search record and/or the browsing record being within a predetermined time period; determining a keyword based on the search record and/or the browsing record; determining, in a preset information stream data set, second information stream data matching the keyword; generating to-be-pushed data based on the first information stream data and the determined second information stream data; and pushing the to-be-pushed data to the terminal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for pushing information, the method comprising:
   in response to an information stream data acquisition request sent by a terminal, performing a query to obtain first information stream data;
   obtaining an alternative word set based on at least one of search statement in a search record or content of a browsed page in a browsing record;
   for each alternative word in the alternative word set:
      determining second information stream data and a preset attribute value corresponding to the second information stream data matching the alternative word;
      calculating a product of the preset attribute value corresponding to the alternative word and a first probability corresponding to the alternative word;
      obtaining a first score corresponding to the alternative word by weighted summation on the preset attribute value, the first probability, and the product; and
      selecting, from the alternative word set, a predetermined number of alternative words as keywords according to an order of the first scores from high to low;
   determining, in a preset information stream data set, second information stream data matching the selected keywords;
   in response to a number of the determined second information stream data matching the selected keywords being greater than a preset number, executing following operations for each piece of the determined second information stream data matching the selected keywords:
      acquiring another preset attribute value corresponding to the second information stream data matching the selected keywords;
      determining respectively, on a basis of a pre-trained second probability determination model, a second probability of receiving a request sent by the terminal for visiting a page pointed to by the second information stream data matching the selected keywords, wherein the second probability determination model is used to characterize a corresponding relationship between the second probability and at least one of following information items: an account information of an account associated with the terminal, a device type of the terminal, type information of a browser used by the terminal, or feature information of the second information stream data matching the selected keywords; and
      determining a second score of the second information stream data matching the selected keywords based on the other acquired preset attribute value and the second probability;

selecting, from the determined second information stream data matching the selected keywords, the preset number of the second information stream data matching the selected keywords according to an order of the second scores from high to low;

aggregating the first information stream data and the selected second information stream data to generate to-be-pushed data; and pushing the to-be-pushed data to the terminal.

2. The method according to claim 1, wherein:

the first probability is determined, on a basis of a pre-trained first probability determination model, which is used to characterize a corresponding relationship between the first probability and at least one of following information items: the account information of an account associated with the terminal, the device type of the terminal, the browser type of the browser used by the terminal, the alternative word, information of an industry to which the alternative word belongs, or a source of the alternative word.

3. The method according to claim 2, wherein obtaining the alternative word set comprises:

performing at least one of statistical analysis or semantic parsing on the at least one of the search statement or the content, to extract at least one core word;

expanding each core word in the at least one core word to obtain an expanded word, wherein the expanded word comprises at least one of the following: a synonym of the core word, a near-synonym of the core word, or an associated word of the core word; and determining the core word and the obtained expanded word as the selected keywords.

4. An apparatus for pushing information, the apparatus comprising:

at least one processor; and a memory storing instructions, the instructions when executed by the at least one processor, cause the at least one processor to perform operations, the operations comprising:

in response to an information stream data acquisition request sent by a terminal, performing a query to obtain first information stream data;

obtaining an alternative word set based on at least one of search statement in a search record or content of a browsed page in a browsing record;

for each alternative word in the alternative word set:

determining second information stream data and a preset attribute value corresponding to the second information stream data matching the alternative word;

calculating a product of the preset attribute value corresponding to the alternative word and a first probability corresponding to the alternative word;

obtaining a first score corresponding to the alternative word by weighted summation on the preset attribute value, the first probability, and the product; and selecting, from the alternative word set, a predetermined number of alternative words as keywords according to an order of the first scores from high to low;

determining, in a preset information stream data set, second information stream data matching the selected keywords;

in response to a number of the determined second information stream data matching the selected keywords being greater than a preset number, executing following operations for each piece of the determined second information stream data matching the selected keywords:

acquiring another preset attribute value corresponding to the second information stream data matching the selected keywords;

determining respectively, on a basis of a pre-trained second probability determination model, a second probability of receiving a request sent by the terminal for visiting a page pointed to by the second information stream data matching the selected keywords, wherein the second probability determination model is used to characterize a corresponding relationship between the second probability and at least one of following information items: an account information of an account associated with the terminal, a device type of the terminal, type information of a browser used by the terminal, or feature information of the second information stream data matching the selected keywords; and determining a second score of the second information stream data matching the selected keywords based on the other acquired preset attribute value and the second probability;

selecting, from the determined second information stream data matching the selected keywords, the preset number of the second information stream data matching the selected keywords according to an order of the second scores from high to low;

aggregating the first information stream data and the selected second information stream data to generate to-be-pushed data; and pushing the to-be-pushed data to the terminal.

5. The apparatus according to claim 4, wherein:

the first probability is determined, on a basis of a pre-trained first probability determination model, which is used to characterize a corresponding relationship between the first probability and at least one of following information items: the account information of an account associated with the terminal, the device type of the terminal, the browser type of the browser used by the terminal, the alternative word, information of an industry to which the alternative word belongs, or a source of the alternative word.

6. The apparatus according to claim 5, wherein obtaining the alternative word set comprises:

performing at least one of statistical analysis or semantic parsing on the at least one of the search statement or the content, to extract at least one core word;

expanding each core word in the at least one core word to obtain an expanded word, wherein the expanded word comprises at least one of the following: a synonym of the core word, a near-synonym of the core word, or an associated word of the core word; and determining the core word and the obtained expanded word as the selected keywords.

7. A non-transitory computer readable storage medium storing a computer program, wherein the computer program, when executed by a processor, causes the processor to perform operations, the operations comprising:

in response to an information stream data acquisition request sent by a terminal, performing a query to obtain first information stream data;

obtaining an alternative word set based on at least one of search statement in a search record or content of a browsed page in a browsing record;

for each alternative word in the alternative word set:
  determining second information stream data and a preset attribute value corresponding to the second information stream data matching the alternative word;
  calculating a product of the preset attribute value corresponding to the alternative word and a first probability corresponding to the alternative word;
  obtaining a first score corresponding to the alternative word by weighted summation on the preset attribute value, the first probability, and the product; and
  selecting, from the alternative word set, a predetermined number of alternative words as keywords according to an order of the first scores from high to low;
determining, in a preset information stream data set, second information stream data matching the selected keywords;
in response to a number of the determined second information stream data matching the selected keywords being greater than a preset number, executing following operations for each piece of the determined second information stream data matching the selected keywords:
  acquiring another preset attribute value corresponding to the second information stream data matching the selected keywords;
  determining respectively, on a basis of a pre-trained second probability determination model, a second probability of receiving a request sent by the terminal for visiting a page pointed to by the second information stream data matching the selected keywords, wherein the second probability determination model is used to characterize a corresponding relationship between the second probability and at least one of following information items: an account information of an account associated with the terminal, a device type of the terminal, type information of a browser used by the terminal, or feature information of the second information stream data matching the selected keywords; and
  determining a second score of the second information stream data matching the selected keywords based on the other acquired preset attribute value and the second probability;
selecting, from the determined second information stream data matching the selected keywords, the preset number of the second information stream data matching the selected keywords according to an order of the second scores from high to low;
aggregating the first information stream data and the selected second information stream data to generate to-be-pushed data; and
pushing the to-be-pushed data to the terminal.

8. The medium according to claim 7, wherein:
the first probability is determined, on a basis of a pre-trained first probability determination model, which is used to characterize a corresponding relationship between the first probability and at least one of following information items: the account information of an account associated with the terminal, the device type of the terminal, the browser type of the browser used by the terminal, the alternative word, information of an industry to which the alternative word belongs, or a source of the alternative word.

9. The medium according to claim 8, wherein obtaining the alternative word set comprises:
performing at least one of statistical analysis or semantic parsing on the at least one of the search statement or the content, to extract at least one core word;
expanding each core word in the at least one core word to obtain an expanded word, wherein the expanded word comprises at least one of the following: a synonym of the core word, a near-synonym of the core word, or an associated word of the core word; and
determining the core word and the obtained expanded word as the selected keywords.

\* \* \* \* \*